US012743850B2

(12) United States Patent
Kondrad et al.

(10) Patent No.: US 12,743,850 B2
(45) Date of Patent: Sep. 22, 2026

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Lukasz Kondrad, Munich (DE); Emre Baris Aksu, Tampere (FI); Lauri Aleksi Ilola, Tampere (FI); Vinod Kumar Malamal Vadakital, Tampere (FI)

(73) Assignee: Nokia Technologies Oy, Espoo (FI)

( * ) Notice: Subject to any disclaimer, the term of this patent is extended or adjusted under 35 U.S.C. 154(b) by 152 days.

(21) Appl. No.: 18/549,827

(22) PCT Filed: Feb. 11, 2022

(86) PCT No.: PCT/FI2022/050083

§ 371 (c)(1),
(2) Date: Sep. 8, 2023

(87) PCT Pub. No.: WO2022/207961

PCT Pub. Date: Oct. 6, 2022

(65) Prior Publication Data

US 2024/0161400 A1 May 16, 2024

(30) Foreign Application Priority Data

Mar. 29, 2021 (FI) .................................... 20215355

(51) Int. Cl.
*G06T 17/00* (2006.01)
*G06F 3/01* (2006.01)

(52) U.S. Cl.
CPC ............ *G06T 17/005* (2013.01); *G06F 3/011* (2013.01)

(58) Field of Classification Search
CPC ........... G06T 17/005; G06T 2219/2016; G06F 3/011; H04N 21/47205; H04N 21/6587
See application file for complete search history.

(56) References Cited

U.S. PATENT DOCUMENTS 5,764,241 A 6/1998 Elliott et al.
10,930,077 B1 * 2/2021 Newcombe ............ G06V 20/20
(Continued)

FOREIGN PATENT DOCUMENTS

WO 2019/229304 A2 12/2019

OTHER PUBLICATIONS

Extended European Search Report received for corresponding European Patent Application No. 22779206.6, dated Dec. 9, 2024, 9 pages.

(Continued)

*Primary Examiner* — Terrell M Robinson
(74) *Attorney, Agent, or Firm* — McCarter & English LLP; Benjamin A. Ailes

(57) ABSTRACT

The embodiments relate to a method and a technical equipment for implementing the method. The method comprises (210) creating a scene structure for a three-dimensional media content, wherein the scene structure comprises three-dimensional data for objects of the three-dimensional media content; (220) determining dependency information for the objects, which dependency information indicates an external factor on which an object is dependent on; (230) storing a scene description defining the objects and their dependency information into a bitstream structure; (240) and transferring a generated scene description to a renderer.

14 Claims, 3 Drawing Sheets

(56) References Cited

U.S. PATENT DOCUMENTS

| | | | | |
|---|---|---|---|---|
| 2006/0117259 | A1* | 6/2006 | Nam | H04N 21/25891<br>348/E7.071 |
| 2008/0266323 | A1* | 10/2008 | Biocca | G06F 3/0426<br>382/154 |
| 2012/0105473 | A1 | 5/2012 | Bar-Zeev et al. | |
| 2018/0082486 | A1* | 3/2018 | Hagbi | G06T 19/006 |
| 2019/0158933 | A1* | 5/2019 | Ouedraogo | H04N 21/21805 |
| 2019/0304156 | A1* | 10/2019 | Amer | G06F 40/216 |
| 2020/0218519 | A1* | 7/2020 | Brebner | G06F 8/60 |
| 2021/0090315 | A1 | 3/2021 | Gladkov et al. | |
| 2021/0409818 | A1* | 12/2021 | Bouazizi | H04N 21/84 |

OTHER PUBLICATIONS

Bhullar et al., "[41.1] On animations and interactivity for volumetric videos", ISO/IEC JTC 1/SC 29/WG 3 m56040, Jan. 2021, 9 pages.

"glTF—what the An overview of the basics of the GL Transmission Format", github, Retrieved on Dec. 31, 2024, Webpage available at: http://github.com/javagl/gltfOverview/releases/download/v2.0.0b/gltfOverview-2.0.Ob-8pages.pdf.

"Potential improvement on ISO/IEC 23090-14 Scene Description for MPEG Media", WG 03, ISO/IEC JTC 1/SC 29/WG 03, N0119, Jan. 2021, 47 pages.

"How to Reduce VR Sickness? Just Add a Virtual Nose", Wired, Retrieved on Oct. 6, 2023, Webpage available at : https://www.wired.com/2015/04/reduce-vr-sickness-just-add-virtual-nose/.

Mayrhofer et al., "A Uniform Resource Identifier for Geographic Locations ('geo' URI)", RFC 5870, Internet Engineering Task Force (IETF), Jun. 2010, pp. 1-23.

Office action received for corresponding Finnish Patent Application No. 20215355, dated Aug. 20, 2021, 8 pages.

International Search Report and Written Opinion received for corresponding Patent Cooperation Treaty Application No. PCT/FI2022/050083, dated May 23, 2022, 16 pages.

* cited by examiner

METHOD, AN APPARATUS AND A COMPUTER PROGRAM PRODUCT FOR VIDEO ENCODING AND VIDEO DECODING

RELATED APPLICATION

This application claims priority to PCT Application No. PCT/FI2022/050083, filed on Feb. 11, 2022, which claims priority to FI application No. 20215355, filed on Mar. 29, 2021, each of which is incorporated herein by reference in its entirety.

TECHNICAL FIELD

The present solution generally relates to coding of immersive media. In particular the present solution relates to scene description for media.

BACKGROUND

Devices that are able to capture image and video have evolved from devices capturing a limited angular field of view to devices capturing 360-degree content. These devices are able to capture visual and audio content all around them, i.e. they can capture the whole angular field of view, which may be referred to as 360 degrees field of view. More precisely, the devices can capture a spherical field of view (i.e., 360 degrees in all spatial directions). In addition to the new types of image/video capturing devices, also new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

Various aspects include a method, an apparatus and a non-transitory computer readable medium comprising a computer program, which are characterized by what is stated in the independent claims. Various details of the example embodiments are disclosed in the dependent claims and in the corresponding images and description.

According to a first aspect, there is provided a method comprising creating a scene structure for a three-dimensional media content, wherein the scene structure comprises three-dimensional data for objects of the three-dimensional media content; determining dependency information for the objects, which dependency information indicates an external factor on which an object is dependent on; storing a scene description defining the objects and their dependency information into a bitstream structure; and transferring a generated scene description to a renderer.

According to a second aspect, there is provided an apparatus comprising means for creating a scene structure for a three-dimensional media content, wherein the scene structure comprises three-dimensional data for objects of the three-dimensional media content; means for determining dependency information for the objects, which dependency information indicates an external factor on which an object is dependent on; means for storing a scene description defining the objects and their dependency information into a bitstream structure; and means for transferring a generated scene description to a renderer.

According to a third aspect, there is provided an apparatus comprising at least one processor, memory including computer program code, the memory and the computer program code configured to, with the at least one processor, cause the apparatus to perform at least the following: creating a scene structure for a three-dimensional media content, wherein the scene structure comprises three-dimensional data for objects of the three-dimensional media content; determining dependency information for the objects, which dependency information indicates an external factor on which an object is dependent on; storing a scene description defining the objects and their dependency information into a bitstream structure; and transferring a generated scene description to a renderer.

According to a fourth aspect, there is provided a computer program product comprising computer program code configured to, when executed on at least one processor, cause an apparatus or a system to create a scene structure for a three-dimensional media content, wherein the scene structure comprises three-dimensional data for objects of the three-dimensional media content; determine dependency information for the objects, which dependency information indicates an external factor on which an object is dependent on; store a scene description defining the objects and their dependency information into a bitstream structure; and transfer a generated scene description to a renderer.

According to an embodiment, the objects are represented as node hierarchy.

According to an embodiment, the dependency information is inherited from parent nodes of the node hierarchy to child nodes of the node hierarchy.

According to an embodiment, the external factor is unavailable during the creation.

According to an embodiment, the external factor comprises one or more of the following: viewer's position, viewer's hand position, viewer's viewport, position of an externally controlled object, position of a real-world object, viewer's rotation, viewer's hand rotation, rotation of an externally controlled object, rotation of a real-world object, viewer's scale, viewer's hand scale, scale of an externally controlled object, scale of a real-world object.

According to an embodiment, the external factor comprises marker information.

According to an embodiment, the bitstream structure is according to Graphics Language Transmission Format (glTF).

According to an embodiment, the dependency information is provided through an extension mechanism of Graphics Language Transmission Format (glTF).

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
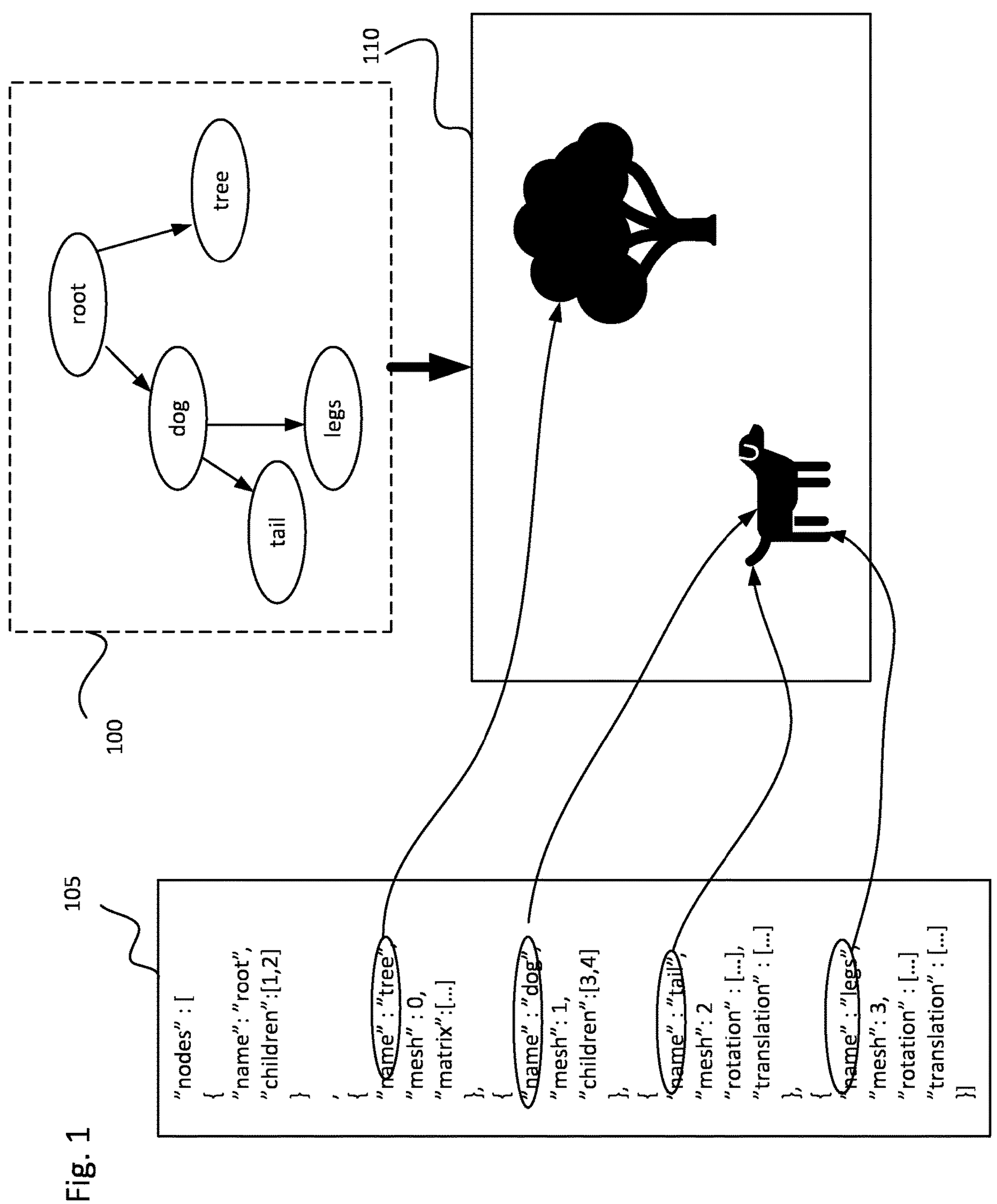
FIG. 1 shows an example of a scene structure.

The following description and drawings are illustrative and are not to be construed as unnecessarily limiting. The specific details are provided for a thorough understanding of the disclosure. However, in certain instances, well-known or conventional details are not described in order to avoid obscuring the description.

References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

Users may consume both videos and images as visual content. However, the consumption of videos and images have been independent on each other. The recent development of applications—such as immersive multimedia—has enabled new use cases where users consume both videos and images together. Immersive multimedia—such as omnidirectional content consumption—is more complex for the end user compared to the consumption of two-dimensional (2D) content. This is due to the higher degree of freedom available to the end user (e.g., three degrees of freedom for yaw, pitch and roll). This freedom also results in more uncertainty.

More and more applications and services are based on three-dimensional (3D) content. In many cases, the 3D content has to be transferred over an internet, and it has to be efficiently rendered on the client side. 3D content that is rendered in client application originates from various sources and is stored in various file formats. In order to render such 3D content, the application has to be capable of reading different input file formats. The scene structure has to be parsed, and the 3D geometry data has to be converted into the format required by the graphics API. This situation has also been identified in the ongoing standardization.

The MPEG standard ISO/IEC 23090 is targeted Coded Representation of Immersive media, where part 14 relates to Scene Description for MPEG Media. As part of ongoing work, the use of scene description formats for enabling immersive augmented reality (AR) and 6-Degrees-of-Freedom (6DoF) experiences are studied. The working group has chosen Khronos® glTF™ as the starting point for MPEG scene description initiative for delivery of three-dimensional (3D) and volumetric assets, as well as temporally changing audio-visual media.

The Graphics Language Transmission Format (glTF) is standard file format for 3D scenes and models. It is a JSON (JavaScript Open Notation) based rendering API (Application Programming Interface) agnostic runtime asset delivery format. glTF bridges the gap between three-dimensional (3D) content creation tools and modern 3D applications by providing an efficient, extensible, interoperable format for the transmission and loading of 3D content.

glTF assets are JSON files plus supporting external data. Specifically, a glTF asset is represented by:

- a JSON-formatted file (.gltf) containing a full scene description: node hierarchy, materials, cameras, as well as descriptor information for meshes, animations, and other constructs;
- binary files (.bin) containing geometry and animation data, and other buffer-based data;
- image files (.jpg, .png) for textures.

The JSON formatted file contains information about the binary files that describes how they may be used when uploaded to GPU with minimal processing. This makes the glTF particularly well suitable for runtime delivery, as the assets may be directly copied into GPU memory for the rendering pipeline.

Assets defined in other formats, such as images, may be stored in external files referenced via Uniform Resource Identifier (URI), stored side-by-side in GLB (binary format of graphics language) container, or embedded into the JSON using data URIs.

glTF has been designed to allow extensibility. While the initial base specification supports a rich feature set, there will be many opportunities for growth and improvement. glTF defines a mechanism that allows the addition of both general-purpose and vendor-specific extension.

The glTF asset contains zero or more scenes, i.e. the set of visual objects to render. Scenes are defined in a scenes array. An additional property, scene (in singular form), identifies which of the scenes in the array is to be displayed at load time.

FIG. 1 shows an example of a scene 110 and corresponding glTF nodes in a scene structure 100. Each scene 110 is represented by a list 105 of nodes it contains in scene.nodes.array. Nodes are organized in a parent-child hierarchy known informally as the node hierarchy, as presented by a scene structure 100. A node is called a root node when it does not have a parent. Each root node can also be a separate scene.

Each node can have a transform. Such a transform will define a translation, rotation, and/or scale. This transform is applied to all element attached to the node itself and to all its child nodes. Any node can define a local space transformation. Each node can be targeted for animation (referenced by an animation.channel.target) in the scene.

glTF supports descriptive and skinned animations via key frame animations. Key frame data is stored in buffers and referenced in animations using accessors. glTF also supports animation of morph targets. Animation capabilities in glTF are relatively limited and only animation of node transforms and morph target weights. Animation of texture for example is not currently supported. Key frame timings are defined as seconds that relate to a specific animation timeline. An animation may consist of several key frames, each descripting the state of an object at said keyframes. The animation is created by interpolating node transformations between key frame states.

glTF only defines animation storage, and it does not define any particular runtime behavior, such as: order of playing, auto-start, loops, mapping of timelines, etc. For example, a glTF file may contain two animations, which both contain key frame timing at 1.0. This does not mean that both or either of the key frames would be played at 1.0 seconds in application time. Animations may each contain multiple channels targeting a model's various bones or properties. The client implementation may choose when to play any of the available animations.

All animations are stored in the animations array of the asset. An animation is defined as a set of channels (the channels property) and a set of samplers that specify accessors with key frame data and interpolation method (the samplers property).

glTF 2.0 defines an extension mechanism that allows the base format to be extended with new capabilities. Any glTF object can have an optional extensions property that lists the extensions that are used by that object.

The Potential Improvements to CD of ISO/IEC 23090-14 document defines extensions to glTF 2.0. Among others it defines MPEG media extension, identified by MPEG_media, and MPEG buffer, identified by MPEG_buffer_circular. MPEG media provides an array of MPEG media items used in the scene. MPEG buffer links MPEG media entry that to the buffer element and indicate that the MPEG media is used as the source of data in the buffer. Presence of MPEG buffer extension in glTF buffer element indicates that the buffer could be updated during the duration of the scene rendering and timing information may be provided.

Once the scenes have been created, the scenes described by glTF have predetermined spatial and visual characteristics. Also animations may be stored in glTF, which provide instructions for transforming nodes as designed by the content creator. Temporal application of animations on the nodes, while visually pre-determined, is left to the application or implementation, and may depend on events that happen during runtime, e.g. user clicks a controller button.

Viewer/observer position or motion in the scene does not impact the position of objects nor animations in the scene. A content producer may wish to include objects (nodes) in a scene whose transformation information would be dependent on or relative to one or more external inputs or factors such as (but not limited to):

- viewer position
- viewer's hand position
- viewer's viewport
- position of an externally controlled object, like another person in the scene (for example placing an icon on tope of another person in VR);
- anything else that is related to information received from an external entity.

However, signalling and carriage of properties for such dependency of objects (nodes) on external input for factors is not supported currently by glTF specification nor by any known extensions, including MPEG extensions to glTF. The present embodiments are targeted to such need.

Thus, the present embodiments provide a method for signalling information in the glTF JSON description, which information enables transforming a node based on the external information available during the runtime process, and which information is generally unavailable or not applicable during the content creation process. The solution may be implemented e.g. by a definition of a new extension.

The functionality according to example embodiments enables new use cases and features for 3D scenes stored in glTF or similar descriptions in a file format or data carriage mechanism alike. Such use cases may relate (but are not limited) to the following examples:

Use Case 1:

Some people suffer from motion sickness, or simulator sickness, while consuming VR content. The avoid motion sickness, a virtual nose can be rendered on the content, which follows the viewer's viewing direction. The nose may be a node of a scene whose translation, rotation, scale would be dependent of a viewer's position and orientation (i.e. viewer's pose). The dependency of the nose on the viewer's position and orientation may be indicated by the example embodiments.

Use Case 2:

While navigating a scene, a placeholder for an MPEG media or realtime communication may be placed in the scene, which then allows following the viewing direction so that it is always visible and perhaps facing the viewer, and at a particular 3D location in space or 2D position on viewport. In a virtual training scenario, such an object could be the volumetric representation of a manufacturing part, which is always visible at e.g. top-right corner of the viewer's viewport, at a fixed distance in 3D space, and locked to the viewer's viewport at fixed 3D position from the viewer. The dependency of the placeholder on the viewport may be indicated by the example embodiments.

The 3D objects as specified using this technique, could take rendering priority and ignore possible depth tests with the content so that the content would always be displayed even when another scene object would be in front of it in 3D space. Alternatively the object could interact with other objects in the scene, when depth collision between the 3D object and the scene occurs due to viewer motion or animations in the scene.

Use Case 3:

A content producer could provide additional objects in the scene that are positioned based on external input information, e.g.

- nodes representing hand of a viewer which animation is performed based on external input;
- selection of buttons, where buttons' position is related to current viewer position;
- a video panel or a volumetric 3D object; when externally triggered to be rendered; to be always rendered at a particular location relative to the palm of the hand (e.g. a 2D video panel only playback when the hand's palm is open and looking upward).

Use Case 4:

Placing objects related to externally controlled entities. For example, placing an icon on another "real" person in mixed reality.

In each of the above use case examples, a dependency between an additional object on the scene and an external input (also referred to as external information or external factor) can be indicated by means of—for example—an extension of the present embodiments. The external factor may comprise for example one or more of the following 3D transformations: viewer's position, viewer's hand position, viewer's viewport, position of an externally controlled object, position of a real-world object, viewer's rotation, viewer's hand rotation, rotation of an externally controlled object, rotation of a real-world object, viewer's scale, viewer's hand scale, scale of an externally controlled object, scale of a real-world object. It is appreciated that other external factors may be used instead or in addition. Example embodiments on how this may be implemented are discussed in the following. It is to be noticed that the example code in the given format is only an illustrative, and thus should not be unnecessarily interpreted as a limiting example:

According to a first example embodiment, an extension for indicating that the node transformation is dependent on the external information or external factor is defined.

MPEG_node_transformation_external.schema.json can be written as follows:

```
{
        "$schema" : "http://json-schema.org/draft-04/schema",
        "title" : "MPEG_node_transformation_external_extension",
        "type" : "object",
        "description": "glTF extension to specify pose in scene is
    dependent on external information",
        "allOf": [ { "$ref": "glTFChildOfRootProperty.schema.json" } ],
        "properties" : {
            "matrix": {
                "uri": {
                    "type": "string",
                    "description": "The uri provides node's source of the
    transformation matrix"
                    "gltf_detailedDescription": "A floating-point 4x4
    transformation matrix stored in column-major order.",
                    "gltf_webgl": "`uniformMatrix4fv( ) ` with the transpose
    parameter equal to false"
                }
            },
            "rotation": {
                "uri": {
                    "type": "string",
                    "description": "The uri provides node's source of unit
    quaternion rotation in the order (x, y, z, w) , where w is the
    scalar.",
                }
                "description": "The node's unit quaternion rotation in the
    order (x, y, z, w), where w is the scalar.",
            },
            "scale": {
                "uri": {
                    "type": "string",
                    "description": "The uri provides node's source of non-
    uniform scale, given as the scaling factors along the x, y, and z
    axes.",
                }
            },
            "translation": {
                "uri": {
                    "type": "string",
                    "description": "The uri provides node's source of
    translation along the x, y, and z axes."
                }
            }
        }
    }
```

An example usage of the extension in an excerpt of glTF JSON is presented below:

```
{
    "nodes": [
        {
            "name": "Box 1",
            "rotation": [
                0,
                0,
                0,
                1
            ],
            "scale": [
                1,
                1,
                1
            ],
            "translation": [
                −17.7082,
                −11.4156,
                2.0922
            ]
        },
        {
            "name": "Box 2 with extenal transformation",
            "extensions": {
```

-continued

```
                MPEG_node_transformation_external: {
                    matrix: {
                        uri: "mpeg:transformation:viewer:pose"
                    }
                }
            }
        }
    ]
}
```

A number of URI elements can be defined to indicate which information is used for the transformations. An example is mpeg:transformation:viewer:pose that indicates the viewer pose should be used as input for the transformation of the node.

Possible URI elements may comprise the following (but not limited to them):

mpeg:transformation:viewer:pose
mpeg:transformation:viewer:translation
mpeg:transformation:viewer:rotation
mpeg:transformation:viewer:scale
mpeg:transformation:viewer:weights
mpeg:transformation:viewer:hand:left mpeg:transformation:viewer:hand:right mpeg:transformation:viewer:location mpeg:transformation:viewenbounding_box It is to be noticed that the given URI schema is provided as an example and can be any other base URI or schema, as long as the viewer and/or the renderer can uniquely identify and parse the information.

Alternatively, instead of the URI, an enumeration value can be used to provide pre-defined information.

According to a second example embodiment, the extension contains a marker information, which—when detected, by an application—would indicate the position of the node. In other words, the node transformation is fixed to an external location that corresponds to the marker. An example of such marker is a QR code.

```
{
        “$schema” : “http://json-schema.org/draft-04/schema”,
        “title” : “MPEG_node_transformation_external extension”,
        “type” : “object”,
        “description”: “glTF extension to specify position of scene is
  dependent on external information”,
        “allOf”: [ { “$ref”: “glTFChildOfRootProperty.schema.json” } ],
        “properties” : {
            “matrix”: {
                “marker_type”: {
                    “type”: “string”,
                    “description”: “The type of marker that will corespond
  to the position oft he node in the scene.”
                }
                “marker_data_uri”: {
                    “type”: “string”,
                    “description”: “The uri that provides the description
  oft he marker”
                }
                “description”: “The renderer will expect an matrix that is
  calculated based on the viewer position and external marker location”
                “gltf_detailedDescription”: “A floating-point 4x4
  transformation matrix stored in column-major order.”,
                “gltf_webgl”: “`uniformMatrix4fv( ) ` with the transpose
  parameter equal to false”
                }
            }
        }
  “required”: [ “marker_data_uri”]
  }
```

An example usage of the extension in an excerpt of glTF JSON is presented below:

```
{
    “nodes”: [
        {
            “name”: “Box 1”,
            “rotation”: [
                0,
                0,
                0,
                1
            ],
            “scale”: [
                1,
                1,
                1
            ],
            “translation”: [
                −17.7082,
                −11.4156,
                2.0922
            ]
        },
        {
            “name”: “Box 2 with extenal transformation”,
            “extensions”: {
                MPEG_node_transformation_external: {
                    matrix: {
                        marker_type: “mpeg:sd:geolocation”
                        marker_data_uri: “data:text/plain; charset=UTF-8;
35.1592;−98.4422; 410”
                    }
                }
            }
        }
```

-continued

```
        ]
    }
```

The renderer will expect a matrix that is calculated based on the viewer position and external marker location. Marker information are provided by the extension.

marker type provides type of the marker e.g. geographic location, QR code data or any other 2D encoded visual code or detectable marker (e.g. a particular shaped light source).

marker_data_uri may be:

- a URI to an external file in format that is compliant with marker type, or
- a URI with embedded base64-encoded data in the following format data:

[<mediatype>][; base64],<data>

An example of plain location encoded in a text is "data:text/plain; charset=UTF−8; 35.1592; −98.4422; 410" the format is (decimal latitude); (decimal longitude); ([optional]elevation in meters)

The type may be not present and just by URI the application may determine the location of an object.

Using RFC 5870, an example of such uri would be geo:37.786971, −122.399677; u=35

In another example, such marker data may be stored as URI items or deductive information items in an ISOBMFF file. Such items may then be referenced using ISOBMFF or HEIF MIME URL referencing mechanisms.

According to a third example embodiment, a URI information described in the first and the second example embodiment could be listed by existing MPEG_media extension and reference by source element of MPEG_buffer_circular extension. The buffer element with the MPEG_buffer_circular extension would be reference by bufferView of animation output sampler, which provide the transformation information, e.g. translation in the example below. In this scenario, the input element of the animation sampler would be set to predefined value (e.g. minus 1), or will be absent, indicating that timing information is provided outside the glTF. As an example, timing information can be provided as an update timing of the output sampler buffer.

An example usage of the idea in an excerpt of glTF JSON is presented below:

```
{
    "animations": [
        {
            "name": "Animate a node 1 rotation channel based on the extenal information",
            "channels": [
                {
                    "sampler": 0,
                    "target": {
                        "node": 1,
                        "path": "translation"
                    }
                },
            ],
            "samplers": [
                {
                    "interpolation": "LINEAR",
                    "output": 0
                }
            ]
        }
    ],
    "accessors": [
```

-continued

```
        {
            "bufferView": 0,
            "byteOffset": 0,
            "componentType": 5126,
            "type": "VEC3"
        }
    ],
    "buffers": [
        {
            "extensions": {
                "MPEG_circular_buffer": {
                "source": 0
        }
    }       }
    ],
    "bufferViews": [
        {
            "buffer": 0,
            "byteLength": 96,
            "byteOffset": 0
        }
    ],
     "extensions": {
        "MPEG_media": {
        "media": [{
            "name": "dynamic_scene_data1",
            "alternatives": [{
                "uri": "mpeg:transformation:viewer:rotation"
            }]
        }]
        }
    }
}
```

According to a fourth example embodiment, for viewer dependent content, alpha coded masks may be provided during composition to generate viewer dependent objects.

One or two masks (for left and right eye) may be provided.

During rendering, the viewport is rendered as usual, and at the final stage of rendering an additional compositing is applied, where the masks are used to composite the viewer dependent objects into the rendered image.

Depending on the importance of how photo-realistic the final rendering is required to be, e.g. on the virtual nose, additional information like specular and normal maps for the virtual nose may also be provided.

According to a fifth example embodiment, for all the above—from first to fourth—example embodiments, a streaming media manifest technology such as DASH may be utilized to signal the presence of such nodes in the scene description. Therefore, the renderers being capable of such viewer dependent rendering features can select them, while the others can select alternative representations. This may be achieved by signalling an EssentialProperty or non-Essential property in the DASH manifest, and related value in the DASH representation level. The value of this EssentialProperty can be a Boolean which indicates that the representation utilizes viewer dependent 3D objects.

In an example, the file which stores the glTF information may have additional brand which indicates the presence of viewer dependent 3D rendering data structures.

In above examples for indicating node dependency on external information has be discussed.

Figure 2:
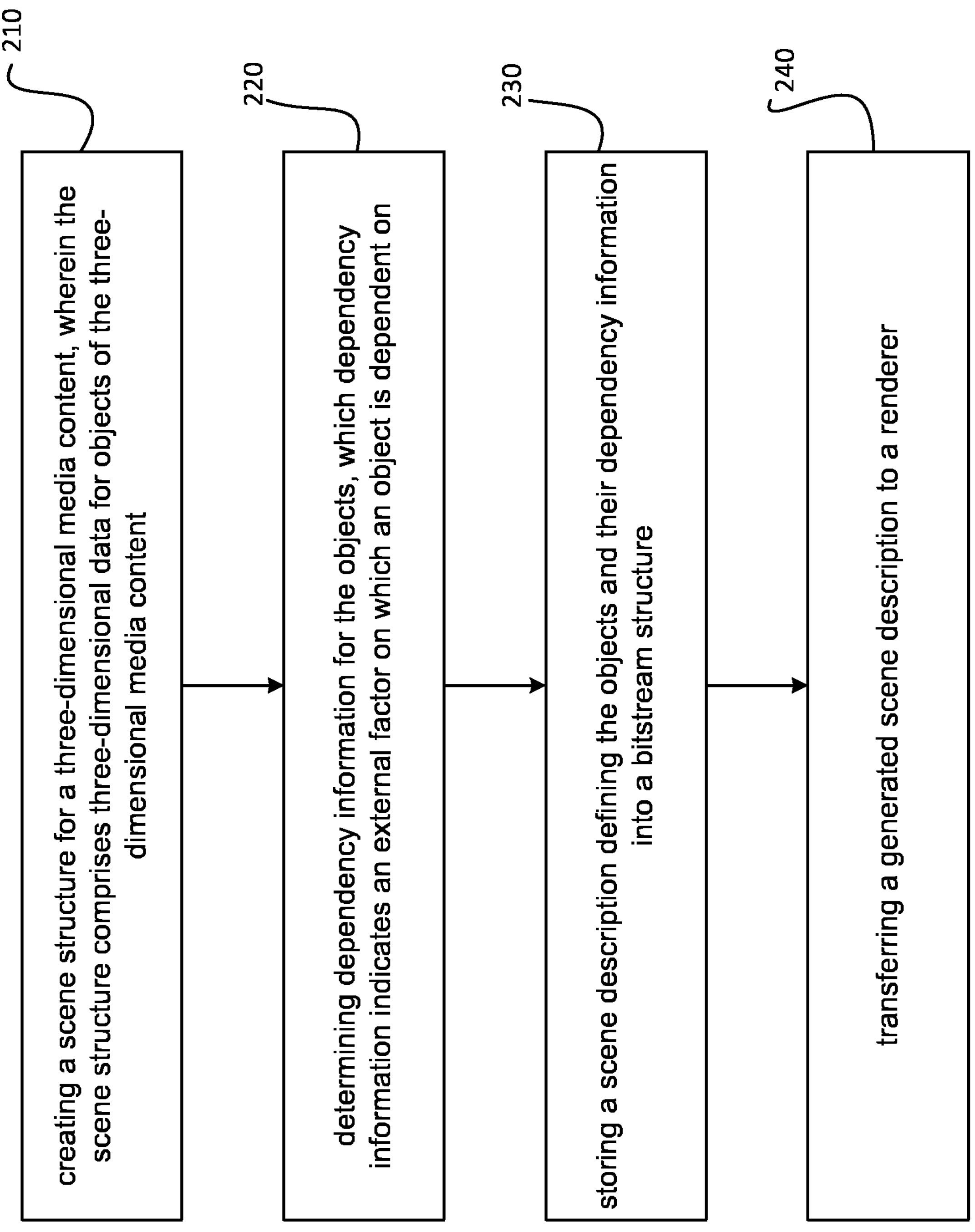
FIG. 2 is a flowchart illustrating a method according to an embodiment.

The method according to an embodiment is shown in FIG. 2. The method generally comprises creating 210 a scene structure for a three-dimensional media content, wherein the scene structure comprises three-dimensional data for objects of the three-dimensional media content; determining 220 dependency information for the objects, which dependency information indicates an external factor on which an object is dependent on; storing 230 a scene description defining the objects and their dependency information into a bitstream structure; and transferring 240 a generated scene description to a renderer. Each of the steps can be implemented by a respective module of a computer system.

An apparatus according to an embodiment comprises means for creating a scene structure for a three-dimensional media content, wherein the scene structure comprises three-dimensional data for objects of the three-dimensional media content; means for determining dependency information for the objects, which dependency information indicates an external factor on which an object is dependent on; means for storing a scene description defining the objects and their dependency information into a bitstream structure; and means for transferring a generated scene description to a renderer. The means comprises at least one processor, and a memory including a computer program code, wherein the processor may further comprise processor circuitry. The memory and the computer program code are configured to, with the at least one processor, cause the apparatus to perform a method according to various embodiments.

Figure 3:
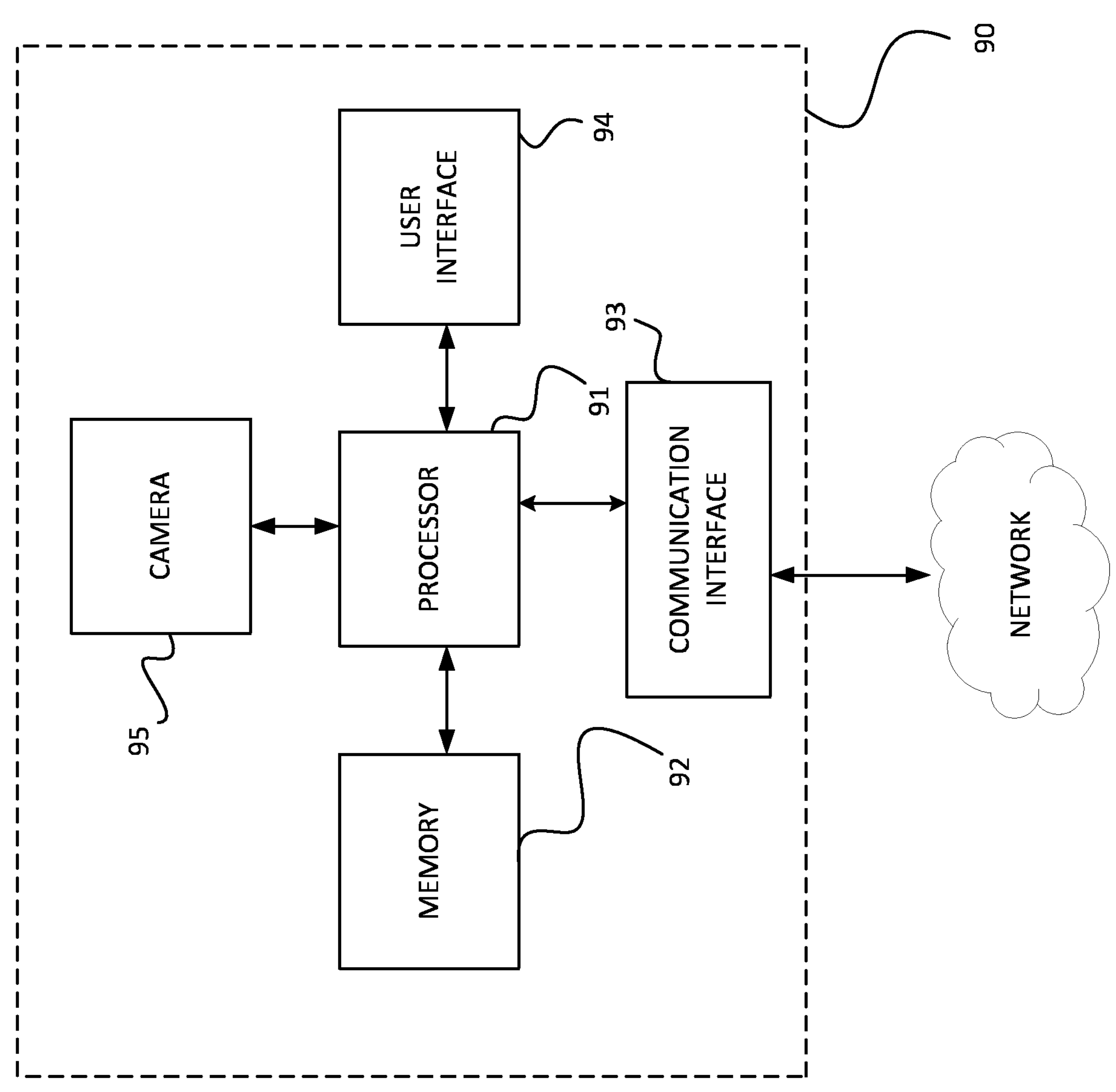
FIG. 3 shows an apparatus according to an embodiment.

An apparatus according to an embodiment is illustrated in FIG. 3. The apparatus is a user equipment (also referred to as "client") for the purposes of the present embodiments, i.e. for content authoring. The apparatus 90 comprises a main processing unit 91, a memory 92, a user interface 94, a communication interface 93. The apparatus according to an embodiment, shown in FIG. 3, also comprises a camera module 95. Alternatively, the apparatus may be configured to receive image and/or video data from an external camera device over a communication network. The memory 92 stores data including computer program code in the apparatus 90. The computer program code is configured to implement the method according various embodiments by means of various computer modules. The camera module 95 or the communication interface 93 receives data, in the form of images or video stream, to be processed by the processor 91. The communication interface 93 forwards processed data, i.e. the image file, for example to a display of another device, such a virtual reality headset. When the apparatus 90 is a video source comprising the camera module 95, user inputs may be received from the user interface.

An example of a device for content consumption, i.e. an apparatus according to another embodiment, is a virtual reality headset, such as a head-mounted display (HMD) for stereo viewing. The head-mounted display may comprise two screen sections or two screens for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module for determining the head movements and direction of the head. The head-mounted display is able to show omnidirectional content (3DOF content) of the recorded/streamed image file to a user.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:

creating a scene structure for three-dimensional media content, wherein the scene structure comprises three-dimensional data for objects of the three-dimensional media content;

determining dependency information for the objects, wherein the dependency information indicates an external factor on which the objects are dependent on for transformation during a runtime process, the external factor relating to a viewer of the three-dimensional media content;

storing a scene description defining the objects and their dependency information into a bitstream structure; and transferring the scene description to a renderer, wherein the external factor comprises marker information and wherein the external factor is unavailable during the creating of the scene structure.

2. The method according to claim 1, wherein the objects are represented as a node hierarchy.

3. The method according to claim 1, wherein the external factor comprises one or more of the following: viewer's position, viewer's hand position, viewer's viewport, position of an externally controlled object, position of a real-world object, viewer's rotation, viewer's hand rotation, rotation of an externally controlled object, rotation of a real-world object, viewer's scale, viewer's hand scale, scale of an externally controlled object, or scale of a real-world object.

4. The method according to claim 1, wherein the bitstream structure is according to graphics language transmission format (glTF).

5. An apparatus comprising at least one processor and a memory including instructions that, when executed with the at least one processor, cause the apparatus to perform at least the following:

creating a scene structure for a three-dimensional media content, wherein the scene structure comprises three-dimensional data for objects of the three-dimensional media content;

determining dependency information for the objects, wherein the dependency information indicates an external factor on which the objects are dependent on for transformation during a runtime process, the external factor relating to a viewer of the three-dimensional media content;

storing a scene description defining the objects and their dependency information into a bitstream structure; and transferring the scene description to a renderer, wherein the external factor comprises marker information and wherein the external factor is unavailable during the creating of the scene structure.

6. The apparatus according to claim 5, wherein the objects are represented as a node hierarchy.

7. The apparatus according to claim 6, wherein the dependency information is inherited from parent nodes of the node hierarchy to child nodes of the node hierarchy.

8. The apparatus according to claim 5, wherein the external factor comprises one or more of the following: viewer's position, viewer's hand position, viewer's viewport, position of an externally controlled object, position of a real-world object, viewer's rotation, viewer's hand rotation, rotation of an externally controlled object, rotation of a real-world object, viewer's scale, viewer's hand scale, scale of an externally controlled object, or scale of a real-world object.

9. The apparatus according to claim 5, wherein the bitstream structure is according to graphics language transmission format (gITF).

10. The apparatus according to claim 9, wherein the dependency information is provided through an extension mechanism of graphics language transmission format (gITF).

11. A non-transitory computer readable medium comprising instructions configured to, when executed with at least one processor, cause an apparatus or a system to:

create a scene structure for a three-dimensional media content, wherein the scene structure comprises three-dimensional data for objects of the three-dimensional media content;

determine dependency information for the objects, wherein the dependency information indicates an external factor on which the objects are dependent on for transformation during a runtime process, the external factor relating to a viewer of the three-dimensional media content;

store a scene description defining the objects and their dependency information into a bitstream structure; and transfer the scene description to a renderer, wherein the external factor comprises marker information and wherein the external factor is unavailable during the creating of the scene structure.

12. The non-transitory computer readable medium according to claim 11, wherein the objects are represented as a node hierarchy.

13. The non-transitory computer readable medium according to claim 12, wherein the dependency information is inherited from parent nodes of the node hierarchy to child nodes of the node hierarchy.

14. The non-transitory computer readable medium according to claim 11, wherein the external factor comprises one or more of the following: viewer's position, viewer's hand position, viewer's viewport, position of an externally controlled object, position of a real-world object, viewer's rotation, viewer's hand rotation, rotation of an externally controlled object, rotation of a real-world object, viewer's scale, viewer's hand scale, scale of an externally controlled object, or scale of a real-world object.

* * * * *